US011436791B2

(12) United States Patent
Albert et al.

(10) Patent No.: US 11,436,791 B2
(45) Date of Patent: Sep. 6, 2022

(54) METHODS AND SYSTEMS FOR ACQUIRING SVBRDF MEASUREMENTS

(71) Applicant: THE REGENTS OF THE UNIVERSITY OF CALIFORNIA, Oakland, CA (US)

(72) Inventors: Rachel A. Albert, Santa Clara, CA (US); James F. O'Brien, El Cerrito, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/399,614

(22) Filed: Apr. 30, 2019

(65) Prior Publication Data

US 2019/0333266 A1    Oct. 31, 2019

Related U.S. Application Data

(60) Provisional application No. 62/664,641, filed on Apr. 30, 2018.

(51) Int. Cl.
| | | |
|---|---|---|
| *G06T 15/50* | (2011.01) |
| *G06K 9/62* | (2022.01) |
| *G06T 5/00* | (2006.01) |
| *G06T 3/40* | (2006.01) |

(52) U.S. Cl.
CPC .......... *G06T 15/506* (2013.01); *G06K 9/6218* (2013.01); *G06T 3/4038* (2013.01); *G06T 5/006* (2013.01); *G06T 2207/10016* (2013.01); *G06T 2207/30204* (2013.01)

(58) Field of Classification Search
CPC ..... G06T 15/506; G06T 3/4038; G06T 5/006; G06T 2207/10016; G06T 2207/30204; G06K 9/6218; G06V 10/462; G06V 10/60; G06V 10/757
See application file for complete search history.

(56) References Cited

U.S. PATENT DOCUMENTS

| | | | | |
|---|---|---|---|---|
| 9,989,463 B2 * | 6/2018 | Skaff | ..................... | G01N 21/255 |
| 2004/0001705 A1 * | 1/2004 | Soupliotis | ............... | G06T 5/003 |
| | | | | 386/242 |
| 2009/0310828 A1 * | 12/2009 | Kakadiaris | ........... | G06V 40/168 |
| | | | | 382/118 |

(Continued)

OTHER PUBLICATIONS

Lensch et al., Image-Based Reconstruction of Spatial Appearance and Geometric Detail, 2003 (Year: 2003).*

(Continued)

*Primary Examiner* — Phong X Nguyen
(74) *Attorney, Agent, or Firm* — McCoy Russell LLP

(57) ABSTRACT

A method of obtaining a spatially varying bidirectional reflectance distribution function for a flat object can include using a video capture device and a light source to capture a video of an area of interest at a relatively fixed distance over the surface of the object, aligning video frame images from the captured video into a single panorama with observations from multiple light and view locations for a number of pixels, clustering the pixels into clusters by similar appearance, and fitting a bidirectional reflectance distribution function to the clusters to generate a high-resolution spatially varying bidirectional reflectance distribution function.

20 Claims, 17 Drawing Sheets

(56) References Cited

U.S. PATENT DOCUMENTS

| | | | | |
|---|---|---|---|---|
| 2013/0093883 | A1* | 4/2013 | Wang | H04N 1/00087 348/142 |
| 2013/0271625 | A1* | 10/2013 | Gruber | G06V 20/20 382/284 |
| 2013/0301952 | A1* | 11/2013 | Ukil | G06T 5/002 382/264 |
| 2016/0161330 | A1* | 6/2016 | Baboulaz | G01J 1/0271 356/445 |
| 2016/0171748 | A1* | 6/2016 | Kohlbrenner | H04N 5/2256 348/48 |
| 2016/0187199 | A1* | 6/2016 | Brunk | G01J 3/2803 348/89 |
| 2017/0161546 | A1* | 6/2017 | Cansizoglu | H04N 13/204 |
| 2017/0256208 | A1* | 9/2017 | Thanikachalam | G06T 15/50 |
| 2018/0005015 | A1* | 1/2018 | Hou | G06V 20/10 |
| 2018/0047208 | A1* | 2/2018 | Marin | H04N 13/243 |
| 2018/0091728 | A1* | 3/2018 | Brown | H04N 5/91 |
| 2018/0160102 | A1* | 6/2018 | Luo | G06T 7/55 |
| 2018/0252642 | A1* | 9/2018 | Fitz-Coy | G01N 21/474 |
| 2018/0322644 | A1* | 11/2018 | Sunkavalli | G06T 7/49 |
| 2021/0358211 | A1* | 11/2021 | Kim | G06T 7/593 |
| 2022/0180103 | A1* | 6/2022 | Lin | G06V 20/42 |
| 2022/0185266 | A1* | 6/2022 | Shah | B60W 30/0956 |

OTHER PUBLICATIONS

Wang et al., Local Phase Coherence and the Perception of Blur, 2004 (Year: 2004).*

Riviere et al., Mobile Surface Reflectometry, 2016 (Year: 2016).*

Goldman, et al., Shape and Spatially-Varying BRDFs from Photometric Stereo, 2010 (Year: 2010).*

Georgoulis et al., Tackling Shapes and BRDFs Head-on, 2014 (Year: 2014).*

Aittala et al., Two-Shot SVBRDF Capture for Stationary Materials, 2015 (Year: 2015).*

Miika Aittala, Timo Aila, and Jaakko Lehtinen. 2016. Reflectance modeling by neural texture synthesis. ACM Transactions on Graphics (TOG) 35, 4 (2016), 65.

Miika Aittala, Tim Weyrich, and Jaakko Lehtinen. 2013. Practical SVBRDF capture in the frequency domain. ACM Trans. Graph. 32, 4 (2013), 110.

Miika Aittala, Tim Weyrich, and Jaakko Lehtinen. 2015. Two-shot SVBRDF capture fortationary materials. ACM Transactions on Graphics (TOG) 34, (Aug. 4, 2015), 110.

David Arthur and Sergei Vassilvitski. 2007. k-means++: The advantages of careful seeding. In Proceedings of the eighteenth annual ACM-SIAM symposium on Discrete algorithms. Society for Industrial and Applied Mathematics, 1027-1035.

F O. Bartell, E. L. Dereniak, and W. L. Wolfe. 1981. The Theory And Measurement Of Bidirectional Reflectance Distribution Function (Brdf) And Bidirectional Transmittance Distribution Function (BTDF), vol. 0257. 154-160. https://doi.org/10.1117/12.959611.

Herbert Bay, Andreas Ess, Tinne Tuytelaars, and Luc Van Gool. 2008. Speeded-up robust features (SURF). Computer vision and image understanding110, 3 (2008), 346-0359.

Neil Blevins. 2005. Leather Material. (Jun. 2005). http://www.neilblevins.com/cg_education/leather_material/leather_material.htm.

Neil Blevins. 2013. Layering Materials. (Sep. 2013). http://www.neilblevins.com/cg_education/layering_materials/layering_materials.htm.

Adam Brady, Jason Lawrence, Pieter Peers, and Wrestley Weimer. 2014. genBRDF: discovering new analytic BRDFs with genetic preprogramming. ACM Trans. Graph. 33 (2014), 114:1-114:11.

Kristin J. Dana, Bram Vtan Ginneken, ShreeBK. Nayar, and Jan J. Koenderink. 1999, Reflectance and texture of real-world surfaces. ACM Transactions on Graphics (TOG) 18, 1 (1999), 1-34, http://dl.acm.org/citation?id=300778.

Francesco Di Renzo, Claudio CalabrCese, and Fabio Pellacini. 2014. Applm: linear spaces for image-based appearance editing. ACM Transaction 33, 6, 2014, 194. http://dl.acm.org/citation.cfm?id=2661282.

Yue Dong, Xin Tong, Fabio Pellacini, and Baining Guo. 2011. AppGen: interactive material modeling from a single image. In ACM Transactions on Graphics (TOG), vol. 30, ACM, 146. http://dl.acm.org/citation.cfm?id=2024180.

Yue Dong, Jiaping Weang, Xin Tong, John Snyder, Yanxiang Lan, Moshe Ben-Ezra, and Baining Guo. 2010. Manifold bootstrapping for SVBRDF capture. In ACM Transactions on Graphics (TOG), vol. 29. ACM, 98. http://dl.acm.org/citation.cfm?id=1778835.

SergiosGarrido-Jurado, Rafael Muñoz-Salinas, Francisco José Madrid-Cuevas, and Manuel Jesús Marín-Jiménez. 2014. Automatic generation and detection of highly reliable fiducial markers under occlusion. Pattern Recognition 47, 6 (2014), 2280-2292.

Abhijeet Ghosh, Tongbo Chen, Pieter Peers, Cyrus A. Wilson, and Paul Debevec. 2010. Circularly polarized spherical illumination reectometry. In ACM Transactions on Graphics (TOG), vol. 29. ACM, 162. http://dl.acm.org/citation.cfm?id=1866163.

Dan B Goldman, Brian Curless, Aaron Hertzmann, and Steven M Seitz. 2010. Shape and Spatially-Varying BRDFs from Photometric Stereo. IEEE Transactions on Pattern Analysis and Machine Intelligence 32, (Jun. 6, 2010), 1060-1071. https://doi.org/10.1109/TPAMI.2009.102.

Antonio Haro and Irfan A. Essa. 2003. Exemplar-Based Surface Texture. 95-101. http://citeseerx.ist.psu.edu/viewdoc/download?doi=10.1.1.398.581&rep=rep1&type=pdf.

Z. Hui and A. C. Sankaranarayanan. 2017. Shape and Spatially-Varying Reflectance Estimation from Virtual Exemplars. IEEE Transactions on Pattern Analysis and Machine Intelligence 39, (Oct. 10, 2017), 2060-2073. https://doi.org/10.1109/TPAMI.2016.2623613.

Zhuo Hui, Kalyan Sunkavalli, Joon-Young Lee, Sunil Hadap, Jian Wang, and Aswin C.Sankaranarayanan. 2017. Reflectance Capture Using Univariate Sampling of BRDFs. In Proceedings of the IEEE Conference on Computer Vision and Pattern Recognition. 5362-5370.

Wenzel Jakob. 2010. Mitsuba renderer. (2010). http://www.mitsuba-renderer.org.

Xiao Li, Yue Dong, Pieter Peers, and Xin Tong. 2017. Modeling Surface Appearance from a Single Photograph Using Self-augmented Convolutional Neural Networks. ACM Trans. Graph. 36, (Jul. 4, 2017), 45:1-45:11. https://doi.org/10.1145/3072959.3073641.

David G. Lowe. 2004. Distinctive image features from scale-invariant keypoints. International journal of computer vision 60, 2 (2004), 91-110.

Wan-Chun Ma, Tim Hawkins, Pieter Peers, Charles-Felix Chabert, Malte Weiss, and Paul Debevec. 2007. Rapid acquisition of specular and diffuse normal maps from polarized spherical gradient illumination. In Proceedings of the 18th Eurographics conference on Rendering Techniques. Eurographics Association, 183-194. http://dl.acm.org/citation.cfm?id=2383873.

Ezio Malis and Manuel Vargas. 2007. Deeper understanding of the homography decomposition for vision-based control. PhD Thesis. INRIA. ACM Transactions on Graphics, vol. 0, No. 0, Article 0. Publication date: Jul. 2018.T.

Ting-Chun Wang, Manmohan Chandraker, Alexei A. Efros, and Ravi Ramamoorthi. 2016. SVBRDF—Invariant Shape and Reflectance Estimation From Light-Field Cameras. 5451-5459. https://www.cv-foundation.org/openaccess/content_cvpr_2016/html/Wang_SVBRDF-Invariant_Shape_and_CVPR_2016_paper.html.

Gregory J. Ward. 1992. Measuring and modeling anisotropic reflection. ACM SIGGRAPH Computer Graphics 26, 2 (1992), 265-272.

Sylvia Wenzl. 2013. Level Camera—Picture Series—Crunchy ByteBox. (2013). http://www.crunchybytebox.de/app.php?id=levelcamera.

Su Xuey, Jiaping Wang, Xin Tong, Qionghai Dai, and Baining Guo. 2008. Image-based based Material Weathering. In Computer Graphics Forum, vol. 27. Wiley Online Library, 617-626. http://onlinelibrary.wiley.com/doi/10.1111/j.1467-8659.2008.01159.x/abstract.

Zhengyou Zhang. 2000. A exible new technique for camera calibration. IEEE Transactions on pattern analysis and machine intelligence 22, 11 (2000), 1330-1334.

(56) References Cited

OTHER PUBLICATIONS

Zhiming Zhou, Guojun Chen, Yue Dong, David Wipf, Yong Yu, John Snyder, and Xin Tong. 2016. Sparse-as-possible SVBRDF Acquisition. ACM Trans.eGraph. 35, (Nov. 6, 2016), 189:1-189:12. https://doi.org/10.1145/2980179.2980247.

Zhenglong Zhou, Zhe Wu, and Ping Tan. 2013. Multi-view photometric stereo with spatially varying isotropic materials. In Proceedings of the IEEE Conference on Computer Vision and Pattern Recognition. 1482-1489.

T. Zickler, R. Ramamoorthi, S. Enrique, and P.N.eBelhumeur. 2006. Reflectance sharing: predicting appearancetfrom a sparse set of images of a known shape. IEEE Trans-actions on Pattern Analysis and Machine Intelligence 28, (Aug. 8, 2006) 1287-1302 https://doi.org/.

Wojciech Matusik. 2003. A data-driven reflectance model. Ph.D. Dissertation. Massachusetts Institute of Technology.

David K. McAllister, Anselmo Lastra, and Wolfgang Heidrich. 2002. Efficient rendering of spatial bi-directional reflectance distribution functions. In Proceedings of the ACM SIGGRAPH/ Eurographics conference on Graphics hardware. Eurographics Association, 79-88. http://dl.acm.org/citation.cfm?id=569057.

Fred E. Nicodemus. 1965. Directional Reectance and Emissivity of an Opaque Surface. Applied Optics 4, (Jul. 7, 1965), 767. https://doi.org/10.1364/AO.4.000767.

Fred E. Nicodemus, Joseph C. Richmond, Jack J. Hsia, Irving W. Ginsberg, and Thomas Limperis. 1977. Geometrical considerations and nomenclature for reectance. vol. 160. US Department of Commerce, National Bureau of Standards Washington, DC, USA. http://graphics.stanford.edu/courses/cs448-05-winter/papers/nicodemus-brdf-nist.pdf.

Jorge Nocedal and Stephen Wright. 2006. Numerical optimization. Springer Science & Business Media.

Andrew Price. 2016. Introducing Poliigon—our new texture site! (May 2016). https://www.blenderguru.com/articles/introducing-poliigon-new-texture-site.

Peiran Ren, Jiaping Wang, John Snyder, Xin Tong, and Baining Guo. 2011. Pocket reectometry. ACM Transactions on Graphics (TOG) 30, (Aug. 4, 2011), 45. https: //doi.org/10.1145/1964921.1964940.

Jérémy Riviere, Ilya Reshetouski, Luka Filipi, and Abhijeet Ghosh. 2017. Polarization imaging reflectometry in the wild. In ACM Transactions on Graphics (TOG), vol. 36. ACM, 206. https://doi.org/10.1145/3130800.3130894.

N. Thanikachalam, L. Baboulaz, D. Firmenich, S. Süsstrunk, and M. Vetterli. 2017. Handheld reflectance acquisition of paintings. IEEE Transactions on Computational Imaging PP, 99 (2017), 1-1. https://doi.org/10.1109/TCI.2017.2749182.

Philip HS Torr and Andrew Zisserman. 2000. MLESAC: A new robust estimator with application to estimating image geometry. Computer Vision and Image Understanding 78, 1 (2000), 138-156.

Andrea Vedaldi and Brian Fulkerson. 2008. VLFeat: An open and portable library of computer vision algorithms. (2008). http://www.vlfeat.org/.

Jiaping Wang, Shuang Zhao, Xin Tong, John Snyder, and Baining Guo. 2008. Modeling anisotropic surface reectance with example-based microfacet synthesis. In ACM Transactions on Graphics (TOG), vol. 27. ACM, 41. http://dl.acm.org/citation.cfm?id=1360640.

Hendrik Lensch, Jan Kautz, Michael Goesele, Wolfgang Heidrich, and Hans-Peter Seidel. 2003. Image-based reconstruction of spatial appearance and geometric detail. ACM Transactions on Graphics (TOG) 22, 2 (2003), 234-257. http://dl.acm.org/citation. cfm?id=636891.

\* cited by examiner

METHODS AND SYSTEMS FOR ACQUIRING SVBRDF MEASUREMENTS

CROSS REFERENCE TO RELATED APPLICATION

This application claims priority to and the benefit of U.S. Provisional Patent Application No. 62/664,641 filed Apr. 30, 2018, the content of which is incorporated herein by reference in its entirety.

BACKGROUND

Artistic expression in the creation of virtual objects has grown tremendously in recent years thanks to research in computer generated geometry, lighting, and materials. However, many real-world surfaces exhibit irregular variations in texture and reflectance that are unique and difficult to reproduce algorithmically. Examples include organic materials such as specific pieces of wood or granite, hand-made surfaces such as paintings, and well-worn objects with particular patterns of dirt, scratches, and aging effects. High-quality results can be achieved when these missing details are filled in manually by artists, but doing so requires significant expertise, well-sourced input images, and hours of manual adjustment. Alternatively, it is also possible to obtain high-quality materials through direct capture, but the capture process is also cumbersome due to the specialized equipment typically required.

There are several ways to represent opaque surface reflectances using data derived from the real world. The most common examples are artist-designed materials, direct measurements of real objects, and parametric reflectance models. Artist-designed materials are represented by a set of layers derived from images, wherein each layer describes a component of the reflectance such as the diffuse color, specular behavior, or normal displacement. The process for creating these materials typically involves sourcing a high-quality photograph of a nearly-flat object, and then recombining filtered versions of the photo with procedurally-generated noise layers. To obtain a realistic result, artists must expend significant time tweaking parameters via trial-and-error. Libraries of materials, called "material packs" are also widely available for purchase, demonstrating both the value of using realistic material models and the effort required to create them. Hand-designed material models generally do not accurately capture the actual reflectance behavior of the real-world material that they are based on. Rather they mimic the real material's appearance, which is sufficient for many rendering applications.

The most complex and complete representations of real materials come from direct measurement. The surface appearance of the object is measured over a densely sampled hemi-sphere of light and view angles, using a device such as a gonioreflectometer, and these data are interpolated at render time from a lookup table. The measurements span a six dimensional space—azimuth and elevation angles for both the camera and light source and 2D coordinates on the surface—called a spatially varying bi-directional reflectance distribution function (svBRDF). Obtaining a measured svBRDF is a time-consuming and memory-intensive process that requires a sample to be brought into a lab with controlled lighting and specialized equipment. Not only are there very few measured svBRDFs available, but this high level of physical accuracy is also generally excessive when only visually plausible images are required.

In many cases the physical plausibility of the material is important, but the reflectance behavior is simple enough it can be accurately represented by a parametric model with only a few parameters. In this case a parametric BRDF model can be created either by choosing arbitrary parameter values, navigating the space of BRDFs with a user interface, or fitting a model to observations of a real object. Well-designed BRDF models adhere to physical limitations such as conservation of energy and reciprocity, without requiring the significant memory overhead of a measured BRDF.

A complete sampling of the six-dimensional svBRDF may be performed using a spatial gonioreflectometer, although this is a lengthy and data-intensive task. Efforts have been made to simplify this process while still accurately capturing all the necessary variation in surface reflectance. Some proposed a hand-held array of LEDs mounted to a camera, along with interpolated svBRDF estimation based on manifold bootstrapping. Some used structured light with basis illumination to estimate reflectance. Some obtained high-quality surface normals and gloss estimation from structured LED lighting. Some used structured LEDs with polarizing filters to estimate the reflectance of spherical objects. Some optimized a sparse blending of sparse basis BRDFs with a limited number of input views. Some obtained uniform isotropic BRDFs from the MERL database with a two-shot capture system.

There have also been a variety of capture systems that employ polarized light to separate the diffuse and specular components. Some used a linear light source on an electronic rig to estimate anisotropic BRDFs, and some proposed a portable setup involving a static mobile phone, a hand-held linear light source, and a collection of carefully selected materials with known BRDFs. However, all of these methods still require expensive or highly specialized equipment for capture.

Another body of work focuses on tools to help artists match the appearance of a material through user input or by simplifying the material representation. Some estimated a simplified model svBRDF for a single texture image and allow users to adjust the behavior of regions of similar appearance until they are satisfied. Some produced a layered BRDF plus texture image based on user edits in material space. Some created a static image with material weathering effects for a single lighting environment. Some also produced a static image with a single light source "baked in" to the material appearance. All of these tools circumvent the need for capturing multiple lighting and viewing angles in favor of simplified appearance estimation.

Some combined texture synthesis from a no-flash photo with reflectance capture from a single flash photo to produce an svBRDF and normal map, however their technique was limited to highly regular, repeated textures. In subsequent work they replicated these results using a single flash image and deep learning techniques, but with less consistent results. Some also used deep learning to estimate the ambient lighting and thereby generate a diffuse, specular, and normal map decomposition of a single arbitrary image.

Some approaches approximate a full svBRDF model using a limited set of input images. Some produce anisotropic svBRDFs by synthesizing a spatially varying Normal Distribution Function (NDF) from sparse light positions. Some estimate an isotropic svBRDF with known geometry using a fixed camera with a moving point light source in a controlled lighting environment. Some use a simplified studio setup with multiple high resolution photographs as well as BRDF clustering to estimate the svBRDF of an object. Some also used BRDF clustering, and their iterative subclustering method is similar to ours, although our capture setup is much simpler. Some estimate an isotropic svBRDF for an arbitrary-shaped object by employing structure from motion (SFM), a ring light source, and a linear combination of basis BRDFs. Some approaches have been proposed for estimating large scale geometry, specularity, and diffuse albedo based on input from a light field camera and a small number of rendered input images.

In the space of mobile phone capture, some estimated reflectance from video and optimized the sampling density and capture path, but with very low-resolution output. Some approaches require capturing several images of a texture sample from different viewpoints with the flash providing illumination and then using a dictionary-based approach to select a BRDF that matches the observations of each pixel. They provide an elegant proof showing that it is insufficient to fit a BRDF using only observations where the light is collocated with the camera, as is the case for a cellphone, but by using a dictionary they are able to still obtain plausible results for cases where the subject materials match an example stored in their library. Some have demonstrated svBRDF capture using mobile phone video.

DETAILED DESCRIPTION

Figure 1:
FIG. 1 illustrates an example of four materials captured using the disclosed methods and rendered with Mitsuba. Objects are illuminated by the Uffizi environment map along with two point light sources. The left two materials were captured with one camera, and the two on the right were captured with two cameras. From left to right: green faux leather, blue damask fabric, red velvet lame, and wrapping paper. Inset images show the average color per pixel as described below.

Embodiments of the disclosed technology generally pertain to new techniques for allowing artists to create physically plausible parametric svBRDF representations of nearly-flat surfaces using simple printed fiducial markers and video obtained from a mobile phone with a flash that can be constantly illuminated. The disclosed techniques do not require any specialized equipment and deliver a realistic representation of the scanned material that is suitable for many artistic applications.

Embodiments may include methods for capturing and modeling the reflectance and small-scale normal displacement of nearly flat surfaces using printed fiducial markers and a mobile phone video with continuous flash. The disclosed techniques may employ a very simple capture process using off-the-shelf hardware, and the output of our system may be directly textured onto 3D objects using standard rendering software. Provided herein are examples showing a variety of materials captured with both one and two cameras and rendered under complex lighting environments.

Embodiments allow a user to add a second cellphone camera to obtain observations from other perspectives that are not collocated with the light. This approach allows for a BRDF model to be fitted directly to the data so that each pixel's appearance is not restricted to an existing dictionary of materials. However, even when only one cell phone is used, the disclosed initialization strategy still allows the fitting process to obtain reasonable results.

The unique video frame alignment technique described herein allows a user to capture reflectance data from a much closer distance (e.g., 10 cm vs 50 cm) and does not require the entire sample to be visible in each input image. By stitching together many partial observations from a closer view distance, very high-resolution results may be obtained even for large samples. High resolution is generally required to obtain good results when rendering the svBRDFs on objects in 3D scenes, particularly for materials with fine-scale specular features such as gold thread or metallic flakes. The closer viewing distance also produces more oblique lighting and viewing angles and a brighter specular highlight, allowing for capture under more varied ambient lighting conditions. Also, the disclosed technology generally does not require either radiometric calibration of the device nor the inclusion of a specific color chart at capture time. For example, fiducial markers may be less than 2 cm square and may be printed anywhere and easily carried in a wallet. These differences expand the possible use cases of casual svBRDF estimation to more varied lighting environments and more accessible tools for capture.

The disclosed capture and fitting technique generally require only one or two cell phone cameras with continuous flash video capability and a set of four small fiducial markers which may be printed on standard copy paper. Using these commonly available tools, an svBRDF may be fitted to mostly-flat, opaque surfaces that have spatially varying reflectance and uneven surface texture.

Fiducial markers may be placed around the area of interest and a short, hand-held flash video may be captured at a relatively fixed distance over the object surface. The resulting video frame images may be aligned and warped into a single panorama in the global coordinate space with observations from multiple light and view locations for each pixel. The pixels may be clustered by similar appearance, a BRDF may be fitted to the clusters, and the system may then recursively sub-divide and fit a BRDF and normal vector displacement to each sub-cluster until the residual fit error at each pixel is sufficiently low.

The resulting output may be a high-resolution svBRDF that can be easily applied to 3D objects for rendering in applications such as Mitsuba. Additionally, because fiducial markers are not required to be visible in each frame, larger regions may be captured at a closer distance than in previous works, enabling high-resolution output with a more well-defined specular lobe in each sample image.

Alignment and Pose Estimation

Aligning the video frames is essentially a panorama stitching problem, and the quality of the alignment must be very precise. Although a traditional panorama need only avoid noticeable seams and distortions, here every pixel location needs to be correctly matched across all light and view positions to avoid spurious correlations between lighting and appearance.

The use of a mobile phone camera for this task creates several difficulties that must be overcome for good quality results. Mobile phone camera lenses are usually wide-angle, wide-aperture, and fixed focal length, with a very narrow depth of field (DOF) and significant barrel or moustache distortion. Traditionally, the lens distortion would be corrected using a checkerboard calibration technique, but such techniques require either a wide DOF or a relatively large viewing distance so that the entire checkerboard is in focus for all rotated camera positions. Furthermore, here it is necessary to use auto-focus to accommodate the hand-held camera motion, but lens "breathing" effects are known to cause lens distortion to vary dramatically across different focus states. Stitching the panorama, therefore, requires solving for both the camera pose and the current lens distortion for every video frame independently.

One possible solution for correcting the distortion would be to use a parametric lens model in conjunction with a homography for the camera pose. However, typical low-order models with two or three parameters are generally not sufficiently accurate, and higher-order models with up to seven parameters are cumbersome, slow to converge, and easily derailed by local minima.

Another solution is to include fiducial markers to establish known physical locations from which one might compute a homography for each frame. To undistort the entire image, the markers would need to be placed on the outside edges of the captured area and all the markers would need to be visible in each video frame. Even for a relatively small sample of 10×10 cm, this arrangement requires a capture distance of at least 30 cm. However, a capture distance closer to 10-15 cm may be more ideal because it may produce more oblique lighting and viewing angles, provide a brighter specular highlight, and allow for a higher resolution image of the surface for BRDF fitting.

In order to capture larger areas at a close distance, a feature-based alignment may be performed for each frame using multiple overlapping homographies to obtain a piecewise linear approximation of the lens distortion.

Figure 2:
FIG. 2 illustrates example images showing the capture setup for one and two cameras.
Figure 2:
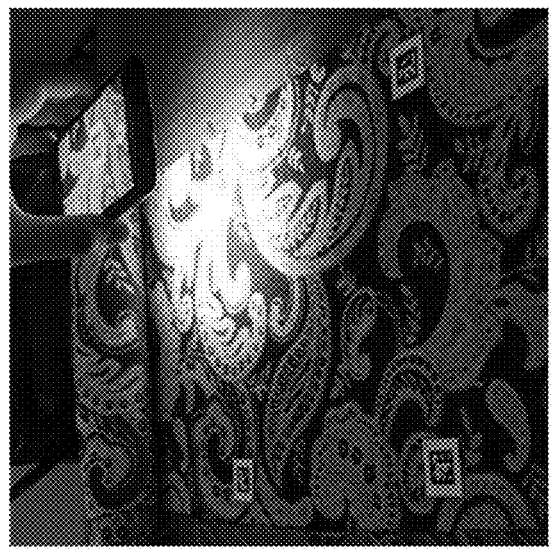

A global coordinate system may be established by placing four printed fiducial markers at the far edges of the captured region and obtaining a single reference image of the entire area. FIG. 2 shows a depiction of the capture setup for one and two cameras. The homography solution for each sub-frame is then calculated relative to this global space, allowing the 3D world coordinate camera and light positions to be estimated for all frames, even though 50-80% of frames have no fiducial markers visible.

Table 2 below shows the alignment parameters used for the coarse and fine alignment steps. Column 1 shows the scale of the input image (coarse or fine). Columns 2 and 3 show the number of SURF and SIFT features extracted from each image (the number of selected SIFT features for matching is shown in parentheses). Columns 4 and 5 show the maximum distance between matched inlier points and the minimum number of inlier points for the MLESAC procedure, respectively.

TABLE 3.1

Alignment Parameters

| Scale | SURF | SIFT | Max. Dist. | Min. Inliers |
|---|---|---|---|---|
| 0.25 | 1,200 | 3,000 (1,200) | 20 pixels | 20 points |
| 1 | 4,800 | 12,000 (4,800) | 60 pixels | 60 points |

Fiducial Markers and Reference Image

Here, fiducial markers were created and detected using the ArUco "6×6 250" predefined library. The actual size of the printed markers was 1.6 cm square. Four markers were placed on the flat capture surface, one in each corner of the area to be captured. An additional reference image containing all four markers was also captured at a distance of approximately 20 cm perpendicular to the surface. The android app "Level Camera" was used to ensure the camera sensor was parallel to the surface for the reference image. The locations of the fiducial marker corner points were recorded separately for both the reference image and in each video frame where the fiducials were visible.

Removing Blurry and Disconnected Frames

Because the camera motion is hand-held without any physical guide or apparatus, irregular motion can sometimes produce blurry frames as a result of intermittent defocus or motion blur. To detect blurry frames, a shifted and scaled Fourier transform f was computed for each image i such that $$f(I) = 20 \cdot \log_{10}(0.001 + \mathcal{F}(i)) \quad (3.1)$$

and frames with a value of f(i) less than 1.5a below the mean across all frames were discarded.

When removing frames due to blur or insufficient feature matches, there is a potential for a small subset of frames to be well-connected to each other but lack at least four points of connection to any other frame in the sequence. In that case it is impossible to determine an unambiguous projective transformation of that subset to the global space. At the end of the feature matching process we therefore obtain the connected sub-graph of the connectivity map with the most members and remove any frames not contained in that sub-graph.

Coarse Alignment

Although each video frame may be trivially assumed to overlap with its immediate neighbors in time, accurate stitching of a full panorama also requires accurate loop closure for non-neighboring frames. However, feature matching across all pairs of frames at full resolution is costly and also likely to return many false matches for self-similar textures. A coarse alignment step may first be performed at a subsampled scale to determine overlapping frames, then the process may be repeated for the full resolution images to obtain the locations of matching features for the final homography estimation. Parameters for both alignment steps are shown above in Table 3.1.

For the coarse alignment step, each frame was downsampled 4×, and a maximum of up to 1,200 uniformly distributed SURF features and 3,000 SIFT features were extracted from each frame. SIFT features were obtained and matched using the CudaSIFT library. Features within a 75 pixel radius of the center of the image were discarded to avoid false matches of the specular highlight. During the feature matching process, all the SURF features and a random subset of 1200 SIFT features were uniquely matched (1 to 1) to all the features from each other frame. The matched feature points were used to estimate a similarity transformation between each pair of frames using MLESAC, with a maximum distance of 20 pixels between inlier feature locations. Any number of inliers greater than 20 was recorded as a potential match.

The resulting matrix of inlier counts (the connectivity map) was further thresholded and filtered to remove spurious matches. The threshold for the minimum number of inliers was determined by the 50th percentile of those frame pairs with some overlap. This ensured that no more than 50% of all frames could be overlapping and only the strongest connections remained. Finally, the connectivity map was smoothed using a 5×5 median filter to remove any non-continuous matches.

Fine Alignment and Subdividing Frames

In the fine alignment step, full-scale feature point locations are divided into sub-frame regions and a global least-squares solution is obtained for the homography transformation of each sub-frame.

Feature matching was only performed for overlapping image pairs from the coarse alignment connectivity map, with slightly modified parameters. The flash feature removal radius, maximum number of SURF features, and the max number of SIFT features were all scaled up by 4×. The maximum feature location distance for MLESAC was set at 60 pixels, and the minimum number of inliers was 60. The large allowable MLESAC distance error is a reflection of the amount of lens distortion. Although larger allowable error may cause incorrect matching, restricting the inliers to only precise matches causes only the undistorted portions of each frame to be matched, and this defeats the purpose of the alignment process completely. It is therefore much better to have a larger distance error and enforce precision by increasing the number of inliers. Ideally, any remaining false matches are greatly outnumbered in the final least squares minimization process.

Figure 3:
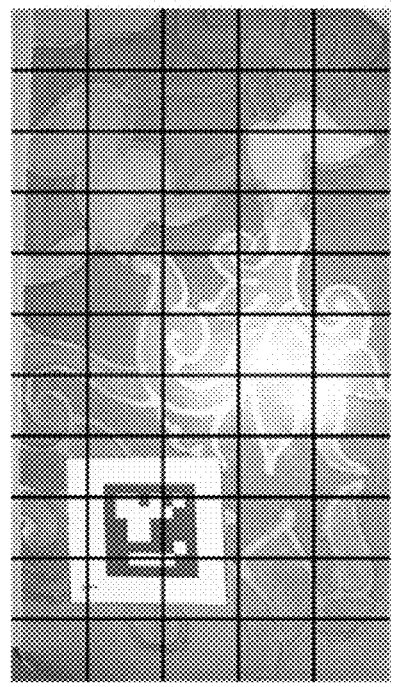
FIG. 3 illustrates an example reference image with the user-selected output region outlined in white, while the right subfigure shows an example video frame from the same data set with sub-frame boundaries overlaid. The contrast of the example video frame has been decreased for visualization. The width of the black lines indicates the overlap between adjacent sub-frames.
Figure 3:

The inliers from each frame were divided up into a 5×11 grid of uniformly sized sub-frames whose dimensions were determined by empirically examining the level of lens distortion in the phone cameras we used. An illustration of the sub-frame divisions is shown in FIG. 3. The size of each sub-frame was 448×370 pixels with an X and Y overlap of 25 and 22 pixels, respectively. Due to similarity of camera hardware specifications across mobile phones, it is likely that these values would be appropriate for other devices as well.

Linear Approximation Solution

Once the corresponding feature locations are obtained, a homography transformation matrix may be solved for each sub-frame to the global space defined by the location of the fiducial markers in the reference image.

To obtain the transformation matrices, a global least-squares fit may be performed simultaneously for all corresponding feature pairs across all overlapping frames. The solution is the set of homography matrices that minimizes the sum of squared differences between the projected global positions of each shared feature point p such that $$\min \Sigma \|F_{p_i} \cdot H_i - F_{p_j} \cdot H_j\|^2 \quad (3.2)$$

where $F_{p_i}$ and $F_{p_j}$ correspond to the [x, y, w] homogeneous coordinates of feature point p in each pair of overlapping sub-frames i, j, and $H_i$ and $H_j$ are the corresponding homography matrices that project each image into the global space.

Unraveling and concatenating all homography matrices $H_i$ into a single vector h allows the constructing of a large sparse matrix $F_{pij}$ where each column corresponds to one entry of h, and each row corresponds to $p_i p_j$ in homogeneous coordinates. The minimization problem then becomes $$F_{pij} \cdot h = 0 \quad (3.3)$$

Furthermore, since a homography is only precise up to a scale factor, the following constraints may be added to define the global space:

$$H_i(3,3)=1 \quad (3.4)$$

such that the (3,3) entry of each homography matrix is defined to be one, and $$F_m \cdot h_m + F_{\notin m} \cdot h_{\notin m} = 0 \quad (3.5)$$

$$F_{\notin m} \cdot h_{\notin m} = -k_m \quad (3.6)$$

where $F_m$ is the set of rows in $F_{pij}$ containing the m fiducial marker points, $h_m$ is the corresponding entries of h, and $F_{\notin m}$ and $h_{\notin m}$ are the remaining entries of $F_{pij}$ and h, respectively. The i entries of $F_m$ are from the marker point locations in each sub-frame, while the j entries are from the marker point locations in the reference image. In (3.6) the product of the known entries is moved to the righthand side of the equation, yielding $k_m$, so that $h_{\notin m}$ may be obtained via least squares.

Pose Estimation

The real-world position of the camera may be determined using the homography of the center sub-frame of each input image. Each transformation matrix is decomposed into its component rotation matrix, $R_i$, and translation vector, $t_i$. These components are used to construct a set of 3D homogeneous matrices as shown in (3.7), wherein each matrix transforms from the reference image pose to the corresponding camera pose for each frame.

$$\begin{bmatrix} R_i & t_i \\ 0 \ 0 \ 0 & 1 \end{bmatrix} \quad (3.7)$$

The reference image camera pose and light position are determined as follows. The field of view (FOV) of the camera is calculated offline using a one-time calibration image with an object of known size at known distance. Both the rigid offset of the flash relative to the camera and the size of the fiducial markers are also measured offline. Here, FOV was measured to be 70°, the XYZ offset of the flash was [1.4, −0.3, 0] centimeters, and the fiducial markers were each 1.6 centimeters tall.

At capture time, the global XYZ origin point is defined to be the point on the captured surface corresponding to the center of the reference image. The reference camera pose is therefore located at [0, 0] in XY. The Z distance is triangulated from the FOV and the average size of the reference fiducial markers in pixels relative to their known physical size in centimeters. The reference light position is obtained by applying the known flash offset to the reference camera pose.

Finally, the world-to-image transformation matrix described in (3.7) is applied to both the reference camera and light positions to obtain the camera and light positions for each frame. Unreliable camera poses located outside the fiducial marker boundaries are discarded, along with their corresponding video frames.

Clustering and BRDF Fitting For each point on the surface, the sparse input samples typically cover only a very tiny sliver of the 4-dimensional hemisphere used to fit a BRDF. However, most materials are made up of many regions that share similar reflectance properties and would all be well-described by a single BRDF with minimal loss of accuracy. Embodiments take advantage of this self-similarity by clustering similar pixels together and fitting a BRDF to each cluster.

Determining the number and size of the clusters presents a trade-off between generalizability and fidelity to the observed data. There are many ambiguous BRDF solutions that can produce the same appearance behavior. Larger clusters are likely to include a more complete sampling of the BRDF hemisphere and therefore converge to a more accurate representation, but they are also more likely to obscure the small details and variation which make spatially varying materials interesting. If the clusters are too small, however, it is probable that over-fitting will produce an incorrect result which does not generalize to novel light and view positions which were absent from the captured video.

Embodiments may include initializing the BRDF with very large clusters and a constrained BRDF model, and then recursively subdivide the clusters, initializing each sub-cluster with the fitting output of its parent. Initial clusters may be grouped based on the average observed color of each pixel and then each cluster and sub-cluster is subdivided based on the per-pixel residual of the fitted BRDF. This encourages each smaller sub-cluster to find a solution in the neighborhood of solutions defined by the larger parent cluster, greatly reducing the likelihood of obtaining an incorrect ambiguous solution.

For each sub-cluster an anisotropic Ward svBRDF may be produced and a normal map. Opaque materials that do not have any Fresnel effects are thus able to be fitted. Due to the feature-based homography alignment process, the scanned material may be required to be relatively flat and have at least some medium-scale albedo variation to align the input video frames.

Clustering and svBRDF Initialization

Using the aligned images, the diffuse albedo color may be coarsely approximated by the average color of each pixel in the global coordinate space. This average color image is then converted to CIE 1976 L*a*b* color space. k-means clustering may then be applied with k-means++ initial centroid positions to the normalized albedo color values. The number of clusters, k, is chosen based on the linear bisection point of the summed squared euclidean error across all values of k in the range k=[2:20]. For this data, typically k=4.

For each initial cluster, an isotropic BRDF may be fitted with a single normal vector for the cluster, constrained to be perpendicular to the surface (that is, n=[0, 0, 1]). This step initializes the $\rho_d$, $\rho_s$, and a to reasonable values for the average normal vector orientation. The initial conditions for the isotropic fitting step are the average color over the entire cluster for the diffuse component ($\rho_d$) and twice the average of the standard deviation across frames for the specular component ($\rho_s$). The roughness parameter ($\alpha$) is initialized to 0.1.

Figure 4:
FIG. 4 illustrates example initial and final sub-clusters for the two-camera red velvet lamé material. The left image shows the average color. Five clusters were obtained in the initial clustering (middle), and the final result included 5,152 sub-clusters (right).
Figure 4:
Figure 4:

Once an isotropic BRDF has been fit to each initial cluster, the least squares fit error may be calculated for each pixel in the cluster and the pixels may be recursively subdivided into two sub-clusters according to the threshold $$t = \text{median}(E_{px}) + \text{mad}(E_{px}) \quad (3.8)$$

where mad is the median absolute deviation and $E_{px}$ is the per-pixel fit error averaged over all observations for each pixel. Each sub-cluster is then fit with a full anisotropic BRDF and a normal offset, and the per-pixel fit error is calculated for the next iteration. The clusters may continue to be subdivided in this way until we reach a minimum cluster size of 50 pixels. FIG. 4 shows an example of the progression from initial to final clusters for the red velvet lamé material.

Redundant Observations

Larger clusters tend to contain many redundant observations of similar materials from almost identical viewpoints. These extra observations dramatically increase the BRDF optimization runtime without improving the accuracy of the fit. To simplify the fitting process, a binning and averaging step may be applied to obtain unique viewpoints. At each sub-clustering iteration, all observations for all pixels may be grouped in the subcluster into 5° increments for each of $\theta_i$, $\varphi_i$, $\theta_r$, and $\varphi_r$, and 1 cm increments for the light radius, r. For each unique combination of these variables, all the BRDF input parameters (including light and view positions and observed color) are averaged together into a single unique observation for fitting. The contribution of each unique observation to the calculated fitting error is then weighted by the number of raw observations included in its average, according to Equation 3.11. To calculate the per-pixel fitting error, the fitted value for each unique viewpoint is applied to all the raw observations in its group.

Reflectance Modeling

The surface appearance may be modeled for each point as the incident light from the camera flash multiplied by the BRDF and modulated by the solid angle of the light source as a function of the incident light angle.

The surface appearance is therefore described as $$L_r(\theta_r, \phi_r) = \int_0^{2\pi} \int_0^{\frac{\pi}{2}} \frac{L_i(\theta_i, \phi_i)}{r^2} \cdot \rho_{bd}(\theta_i, \phi_i; \theta_r, \phi_r) \cdot \cos(\theta_i) \sin(\theta_i) d\theta_i d\phi_i \quad (3.9)$$

where $L_r$ is the reflected radiance to the camera
$L_i$ is the incident radiance from the light
$\rho_{bd}$ is the BRDF
$\theta_r$ and $\varphi_r$ are the camera elevation and azimuth angles
$\theta_i$ and $\varphi_i$ are the light elevation and azimuth angles dA is the differential surface area of each pixel
$r^2$ is the radial distance to the light and all angles are relative to the normal vector. The ambient light is not explicitly modeled but rather implicitly incorporated into the BRDF.

The $\rho_{bd}$ term in (3.9) is the Ward BRDF model, described by the following equation:

$$\rho_{bd}(\theta_i, \phi_i; \theta_r, \phi_r) = \frac{\rho_d}{\pi} + \frac{\rho_s \cdot e^{-\tan^2(\theta_h)\left(\frac{\cos^2(\phi_h)}{\alpha_x^2} + \frac{\sin^2(\phi_h)}{\alpha_y^2}\right)}}{4\pi \cdot \alpha_x \cdot \alpha_y \cdot \sqrt{\cos(\theta_i) \cdot \cos(\theta_r)}} \quad (3.10)$$

where $\rho_d$ and $\rho_s$ are the diffuse and specular albedo values
$\alpha_x$ and $\alpha_y$ are the roughness parameters in X and Y
$\theta_h$ and $\varphi_h$ are the elevation and azimuthal angles of the half-vector between the light and camera.

In the initial clustering step, an isotropic variant of this model is used wherein $\alpha_x = \alpha_y$. Subsequent subclustering iterations are fitted using the full anisotropic BRDF model and two normal vector offset angles, $n_{\theta_x}$, and $n_{\theta_z}$, which describe the rotation of the normal vector about the X and Z axes respectively. In the final svBRDF and normal map, all the pixels in each sub-cluster are therefore represented by the eight BRDF parameters above (one per color channel for $\rho_d$ and $\rho_s$) and two normal vector offset parameters.

The optimization problem is thus $$\text{Minimize} \Sigma w \cdot \Sigma (\max(0, \min(L_f, 1)) - L_o)^2 \quad (3.11)$$

subject to $\{\rho_d, \rho_s\} \geq 0$  $0° \leq n_{\theta_x} \leq 45°$ $\{\alpha_x, \alpha_y\} > 0$  $0 \leq n_{\theta_z} \leq 180°$ $\rho_d + \rho_s \leq 1$.

where $L_o$ is the observed color values, $L_f$ is the fitted BRDF evaluated at corresponding angles to $L_o$, and w is the number of samples per unique viewpoint as described in section 3.2. (3.11) may be solved for using a sequential quadratic programming (SQP) optimization function.

Joining Two Video Streams

Although the reflectance properties of many materials are well-described by observations using a single collocated camera and light source, incorporating a second simultaneous video stream allows for the capture of somewhat more complex materials without requiring other specialized tools. By capturing one video with the camera flash turned on alongside a second no-flash video, the behavior of the scanned material may be observed at more oblique light and view angles and, thus, a more complete sampling of the BRDF may be obtained.

The majority of the pipeline may be image-based and accept a second video stream without any modification. The only requirement may be that the two video streams be temporally synchronized at the first frame of each video, and that the length of the no-flash video be shorter than the flash video. This ensures that the position of the light source is known for all observed input frames.

To synchronize the time streams, the no-flash recording may begin first and then the start of the no-flash video may be cropped to the frame where the light from the flash camera first appears. At the frame rates used in the capture setup the actual transition frame is typically highly visible because the rolling shutter effect produces an obvious transition line across the frame. This method afforded acceptable synchronization for the application where the hand-held cameras are moving relatively slowly.

Example Results

In an example, capture data were obtained using a Samsung Galaxy S6 (or S7 for the second camera). The resolution of the reference images was 5312×2988, and the videos were captured at a rate of 30 frames per second (fps) and resolution of 2160×3840 pixels. Video was captured in Pro-Mode with the flash turned on, using a shutter speed of 1/500 seconds and an appropriate ISO setting for the ambient light level, between 50 and 400. White balance was manually set at the beginning of each video to ensure consistency across frames.

The camera was moved over the surface by hand in a sinusoidal top-to-bottom and side-to-side fashion to achieve relatively even coverage of the entire captured area. Typical video capture distance was between 10-20 centimeters from the surface, and reference image capture distance was usually around 20-30 centimeters. The supplemental material includes a diagram of the capture setup. Each video was 15-30 seconds in duration, covering an area of approximately 20×20 cm. From this sequence extracted every 5th frame (6 fps) was extracted for the single-camera examples and every 10th frame (3 fps) for the two-camera examples. This sampling rate was an acceptable trade-off between sampling density and data processing limitations.

Provided herein are examples of seven materials captured with only a single camera (aged metal patina, blue damask fabric, buffalo leather, metallic embossed paper, orange ceramic tile, damask fabric reversed, and wood block), and seven materials captured with both one and two cameras for comparison (abstract oil painting, green faux leather, red velvet lame, woven rattan mat, wrapping paper, corkboard, and shiny white tile).

Figure 5:
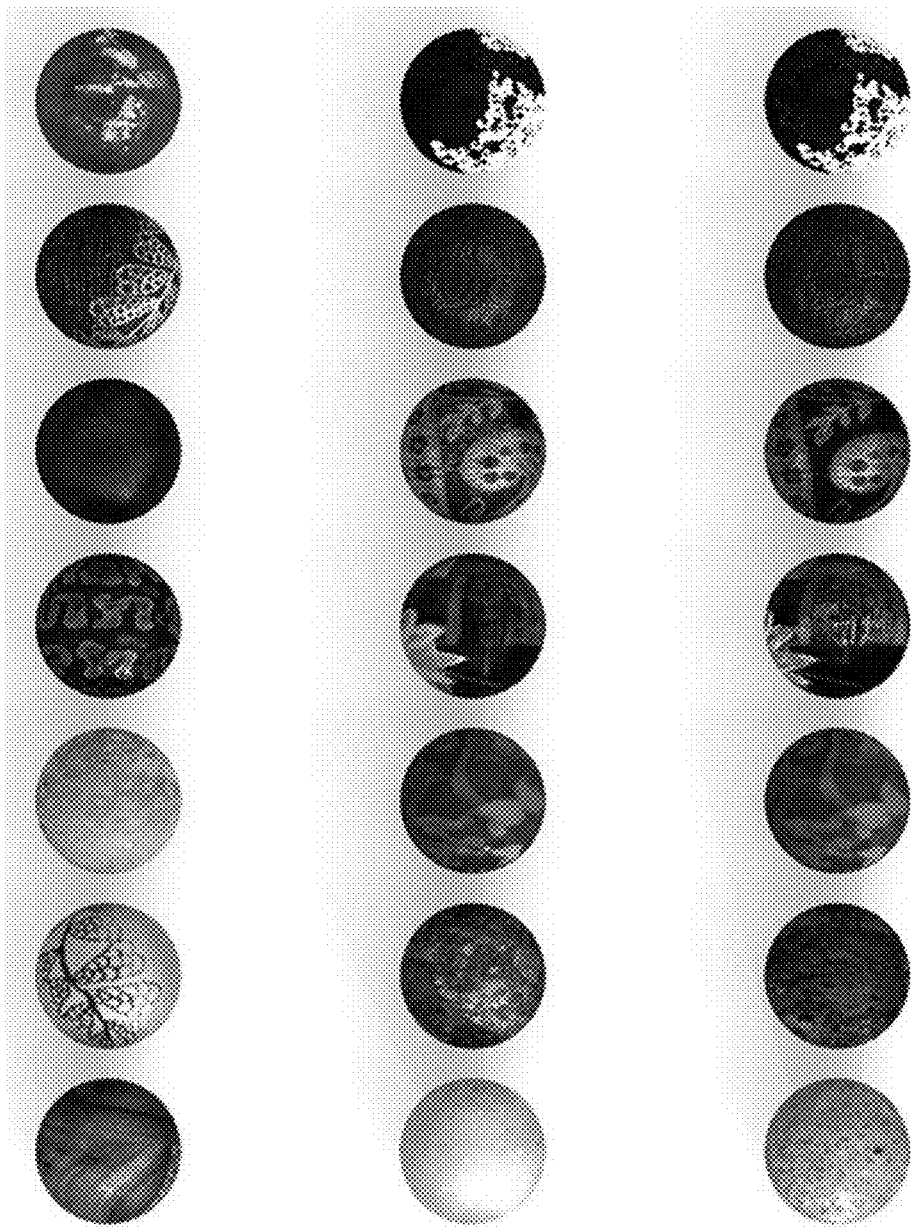
FIG. 5 illustrates an example of scanned materials rendered onto spheres with Mitsuba and illuminated by the Pisa environment map and a single additional point light source. The right-most row is captured with two cameras, the middle row depicts the same materials captured with a single camera, and the left-most row shows additional materials captured with only one camera. From top to bottom and left to right: abstract oil painting, green faux leather, red velvet lame, woven rattan mat, wrapping paper, corkboard, shiny white tile, aged metal patina, blue damask fabric, buffalo leather, metallic embossed paper, orange ceramic tile, damask fabric reversed, and wood block.
Figure 6:
FIG. 6 illustrates an example of a natural scene with three scanned materials rendered with Mitsuba and illuminated by the Pisa environment map and a single additional point light source. The table surface is textured with the damask fabric reversed material, the teapot is textured with the faux green leather material, and the teacup is textured with the aged metal patina material.

FIG. 5 shows a rendering of all the captured materials mapped onto spheres and illuminated by the Pisa environment map with a single additional point light source. The examples in the top row are captured with two cameras, the middle row depicts the same materials captured with a single camera, and the bottom row shows additional materials captured with only one camera. FIG. 6 also shows several of the same materials used in a more natural scene under the same illumination.

Figure 7:
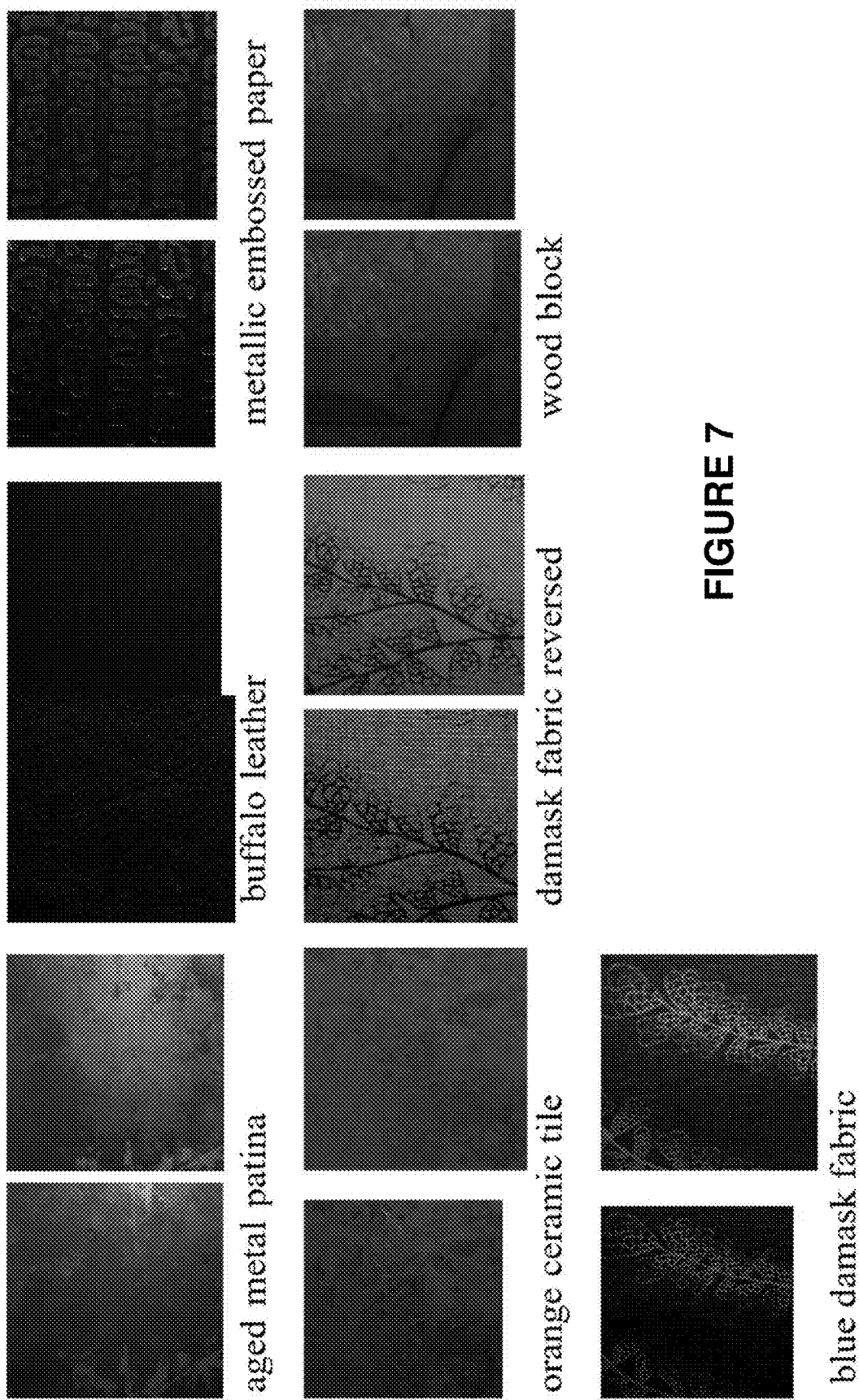
FIG. 7 illustrates an example comparison to a ground truth photo with an oblique light angle not included in the input fitting data. For each material shown, the first image is the ground truth and the second image is a rendering with the same light pose as the ground truth using the data captured with one camera. Images have been cropped square and resized to fit.
Figure 8:
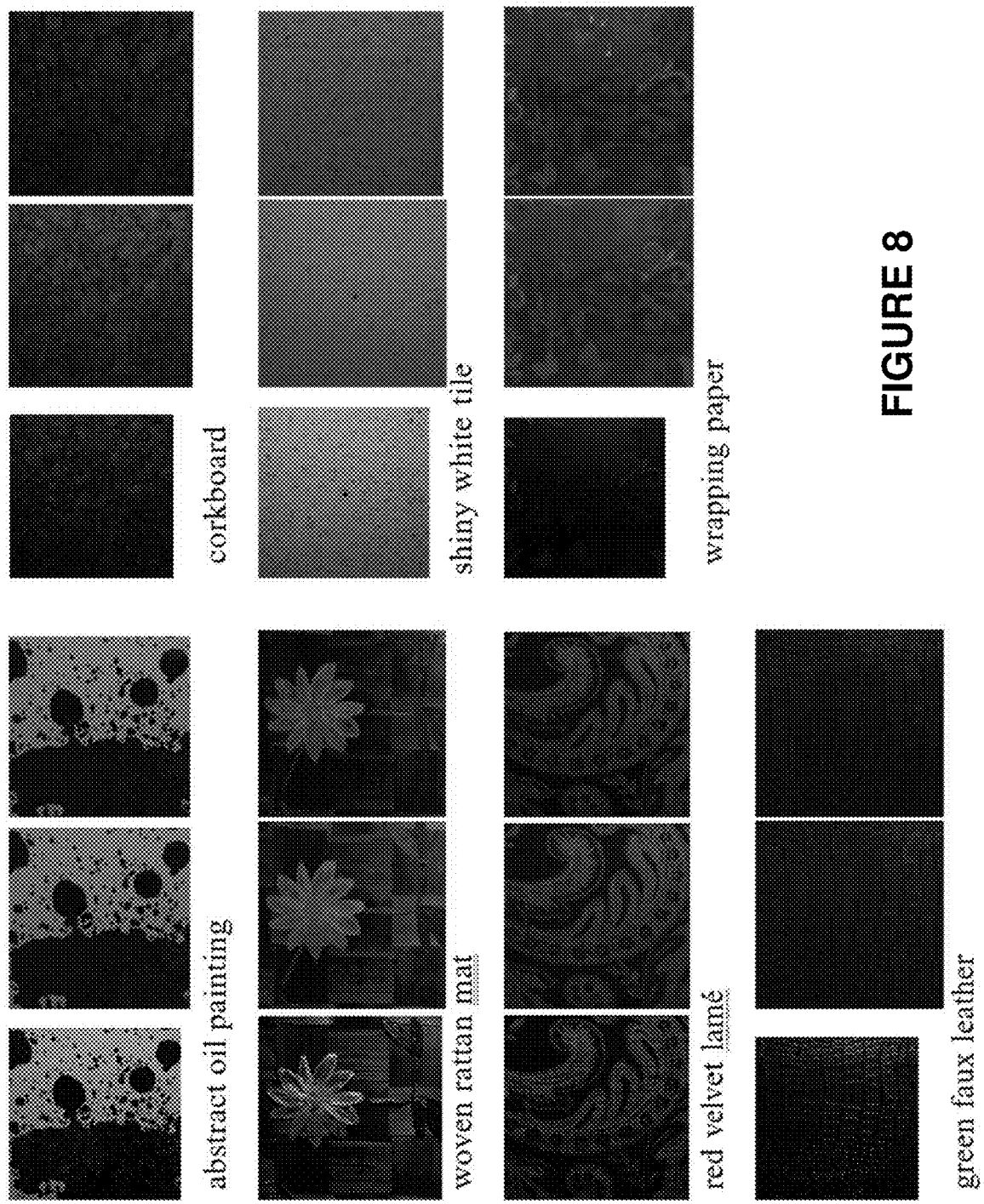
FIG. 8 illustrates an example comparison to a ground truth photo with an oblique light angle not included in the input fitting data. For each material shown, the first image is the ground truth, the second image is a rendering with the same light pose as the ground truth using the data captured with one camera, and the third image shows the same rendering using the data captured with two cameras. Images have been cropped square and resized to fit.
Figure 9:
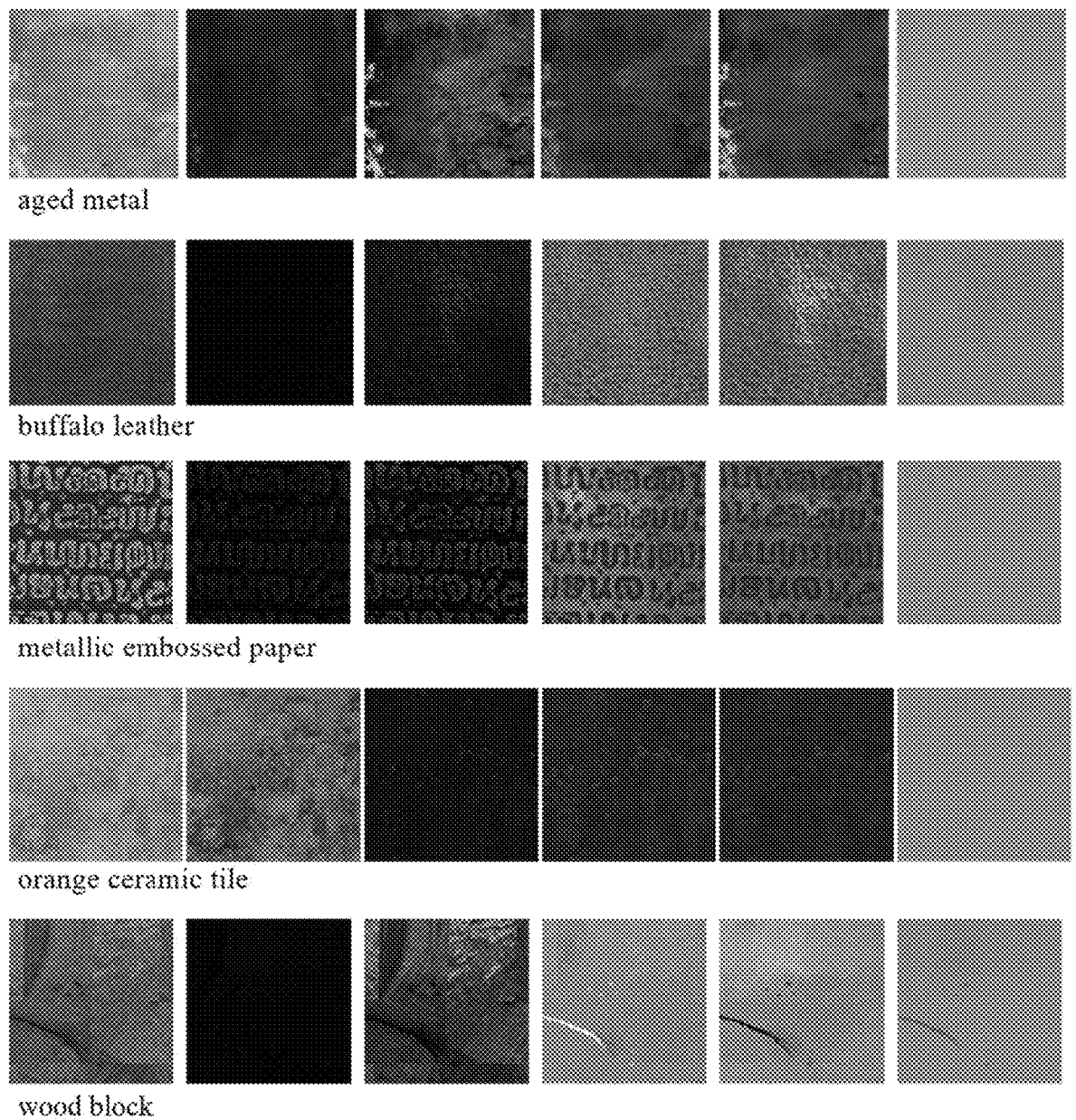
FIG. 9 illustrates a sample of the results for seven materials captured with one camera. Each row, from left to right: average color, $\rho_d$, $\rho_s$, $\alpha_x$, $\alpha_y$, and the normal offset map. Images have been cropped square and resized to fit.
Figure 10:
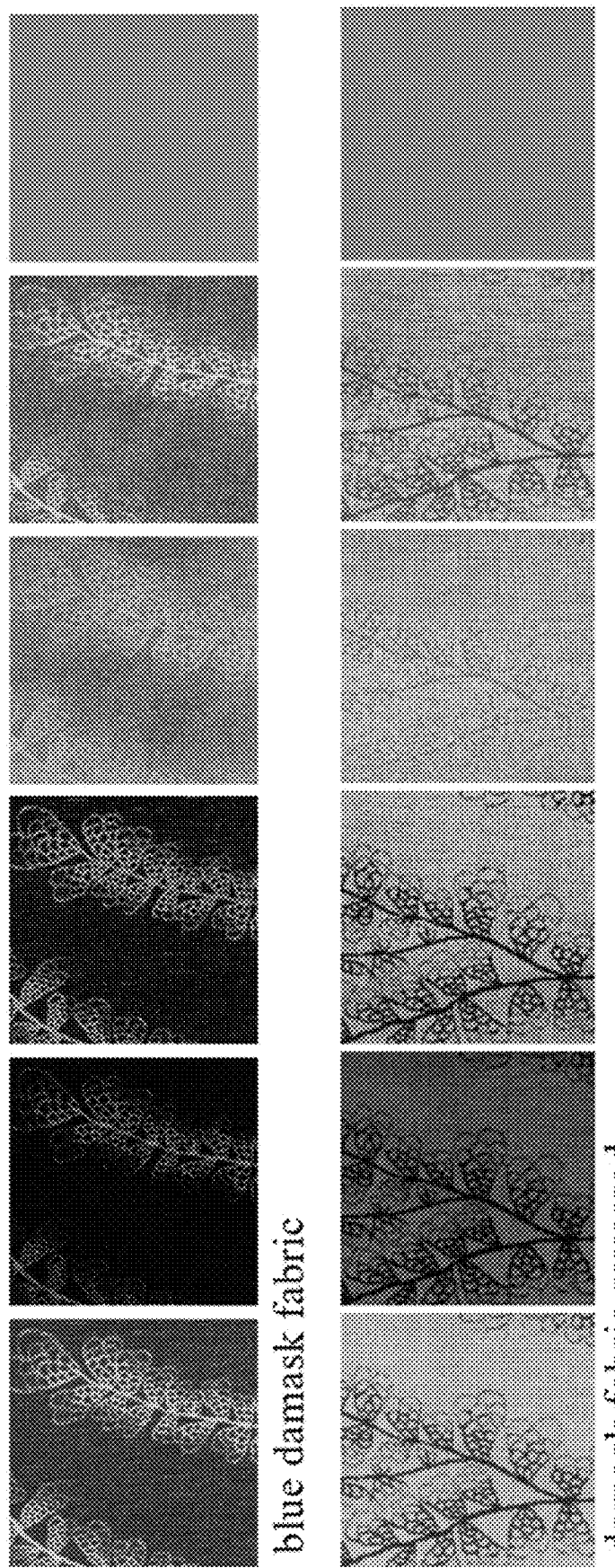
FIG. 10 illustrates a sample of the results for seven materials captured with one camera. Each row, from left to right: average color, $\rho_d$, $\rho_s$, $\alpha_x$, $\alpha_y$, and the normal offset map. Images have been cropped square and resized to fit.
Figure 11:
FIG. 11 illustrates example results showing the fitted svBRDF output. The top row of each material shows the results for one camera, while the bottom row shows the results for two cameras. Each row, from left to right: average color, $\rho_d$, $\rho_s$, $\alpha_x$, $\alpha_y$, and the normal offset map. Images have been cropped square and resized to fit.
Figure 11:
Figure 12:
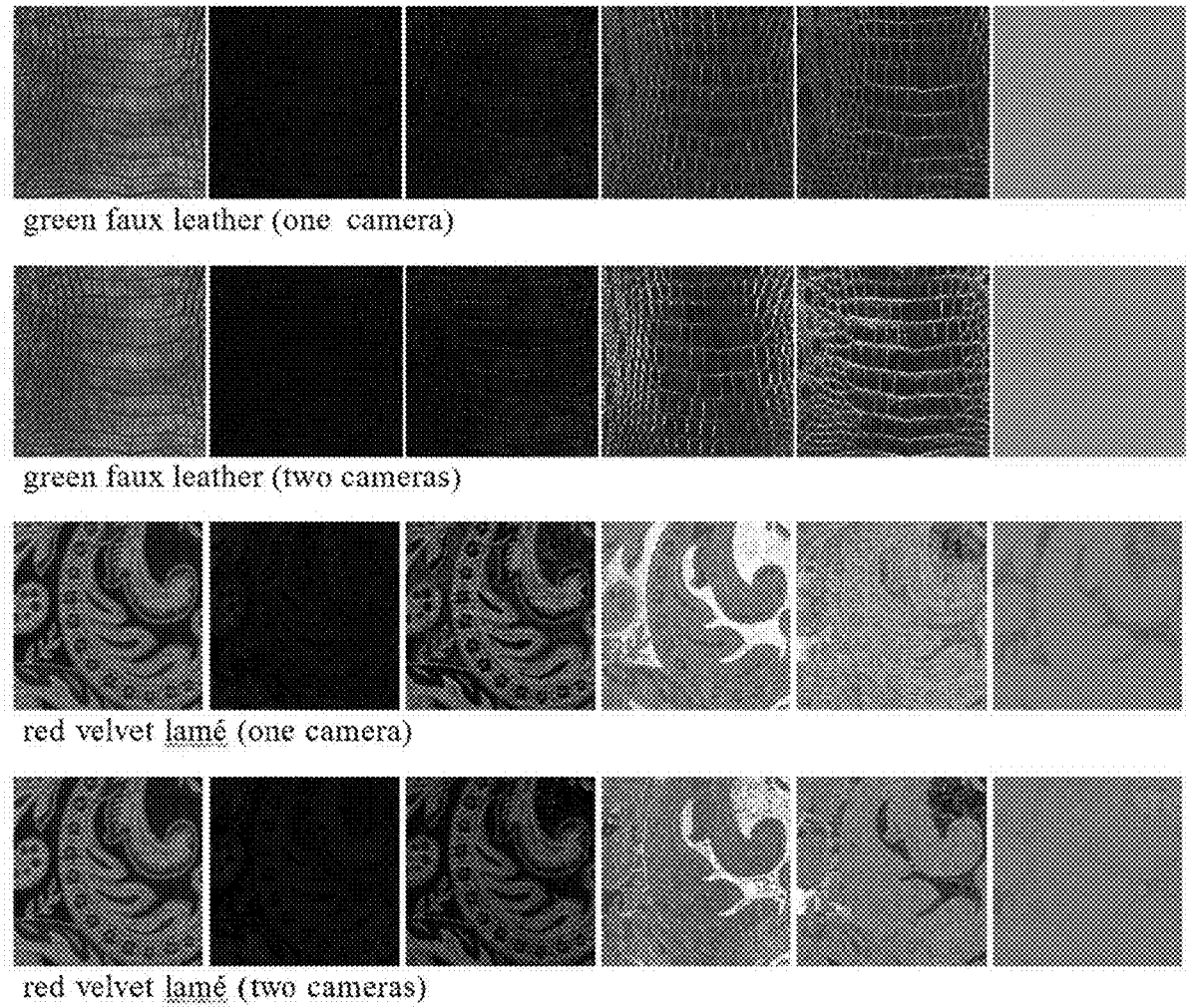
FIG. 12 illustrates example results showing the fitted svBRDF output. The top row of each material shows the results for one camera, while the bottom row shows the results for two cameras. Each row, from left to right: average color, $\rho_d$, $\rho_s$, $\alpha_x$, $\alpha_y$, and the normal offset map. Images have been cropped square and resized to fit.
Figure 13:
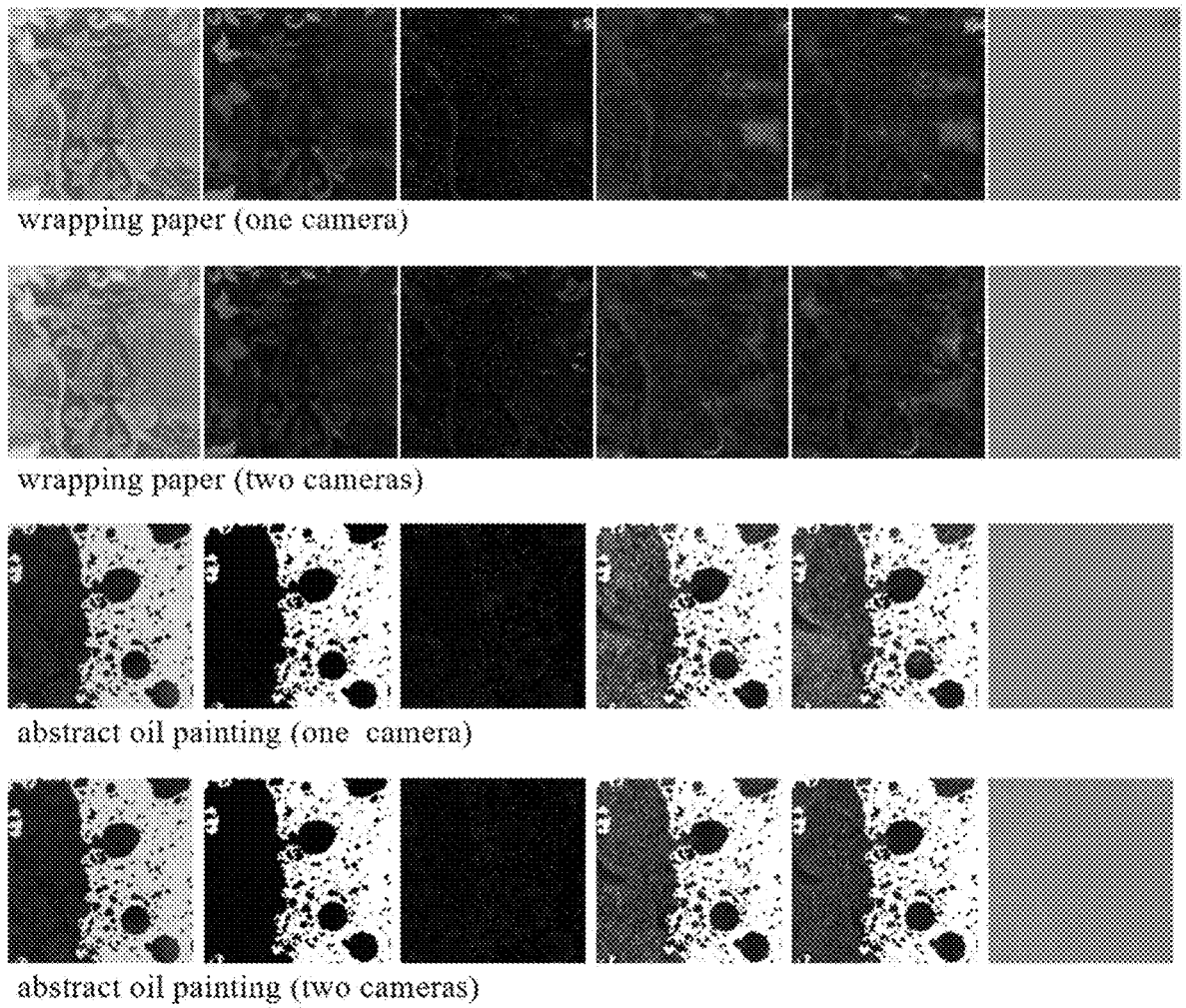
FIG. 13 illustrates example results showing the fitted svBRDF output. The top row of each material shows the results for one camera, while the bottom row shows the results for two cameras. Each row, from left to right: average color, $\rho_d$, $\rho_s$, $\alpha_x$, $\alpha_y$, and the normal offset map. Images have been cropped square and resized to fit.
Figure 14:
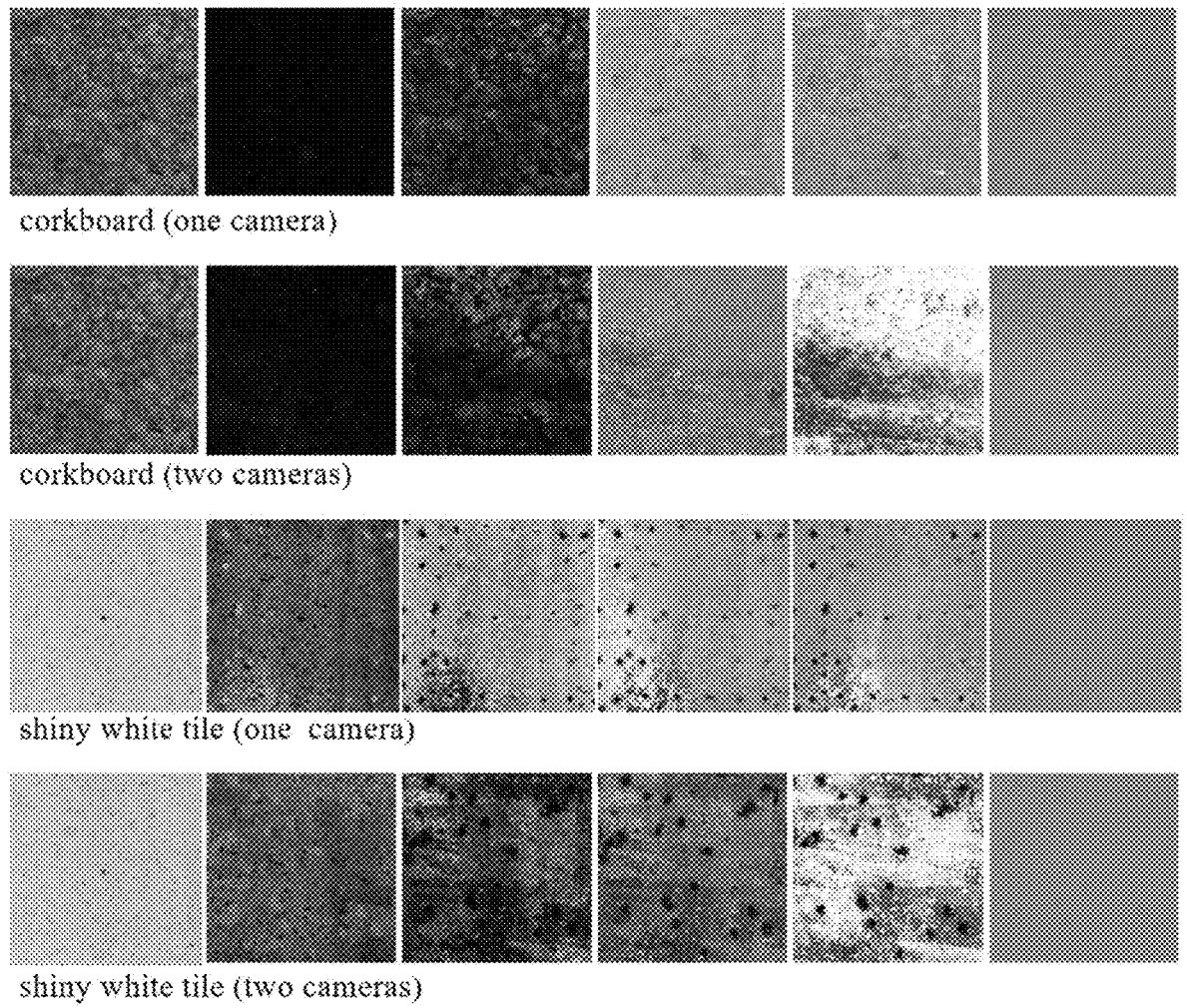
FIG. 14 illustrates example results showing two failure cases for the fitted svBRDF output. The top row of each material shows the results for one camera, while the bottom row shows the results for two cameras. Each row, from left to right: average color, $\rho_d$, $\rho_s$, $\alpha_x$, $\alpha_y$, and the normal offset map. Images have been cropped square and resized to fit.

Included in FIGS. 7 and 8 is a comparison to ground truth using a very oblique light position. This comparison is very challenging because the lighting configuration is very different from anything in the input data for fitting the svBRDF, so the algorithm must rely on smoothness assumptions implicit in the Ward model. It is apparent that some high frequency texture and corresponding specular highlights are missing for several materials. These highlights most likely occupy a very sharp peak of the BRDF, and are thus difficult for any method to accurately reproduce without direct observation. Nonetheless the disclosed methods generally produce a plausible appearance for these samples.

Each of the svBRDF output layers is also included for more detailed analysis in FIGS. 9 through 14. The leftmost column is the average color as described in section 3.2. The remaining columns are the diffuse color ($\rho_d$), the specular color ($\rho_s$), the roughness parameter in the X direction ($\alpha_x$), the roughness parameter in the Y direction ($\alpha_y$), and the normal offset map. For materials captured with both one and two cameras, the results are shown side by side for comparison.

The differences between the quality of the single and dual camera results for the red velvet lame and wrapping paper materials reveal the importance of broader sampling for more complex materials. The diffuse parameter color is slightly darker for the two-camera wrapping paper example, but the overall result is very similar to the one camera result. However, for the red velvet lame, the single camera case has much more trouble separating and distinguishing reflectance behavior that changes quickly with direction. Usable results are still obtained with a single camera, but the algorithm is unable to disambiguate between a bright surface tilted away from the camera and a darker surface tilted toward the camera, resulting in over-fitting to the data. While this problem could potentially be corrected manually, two cameras is typically the preferred option when accurate reproduction is desired.

Figure 15:
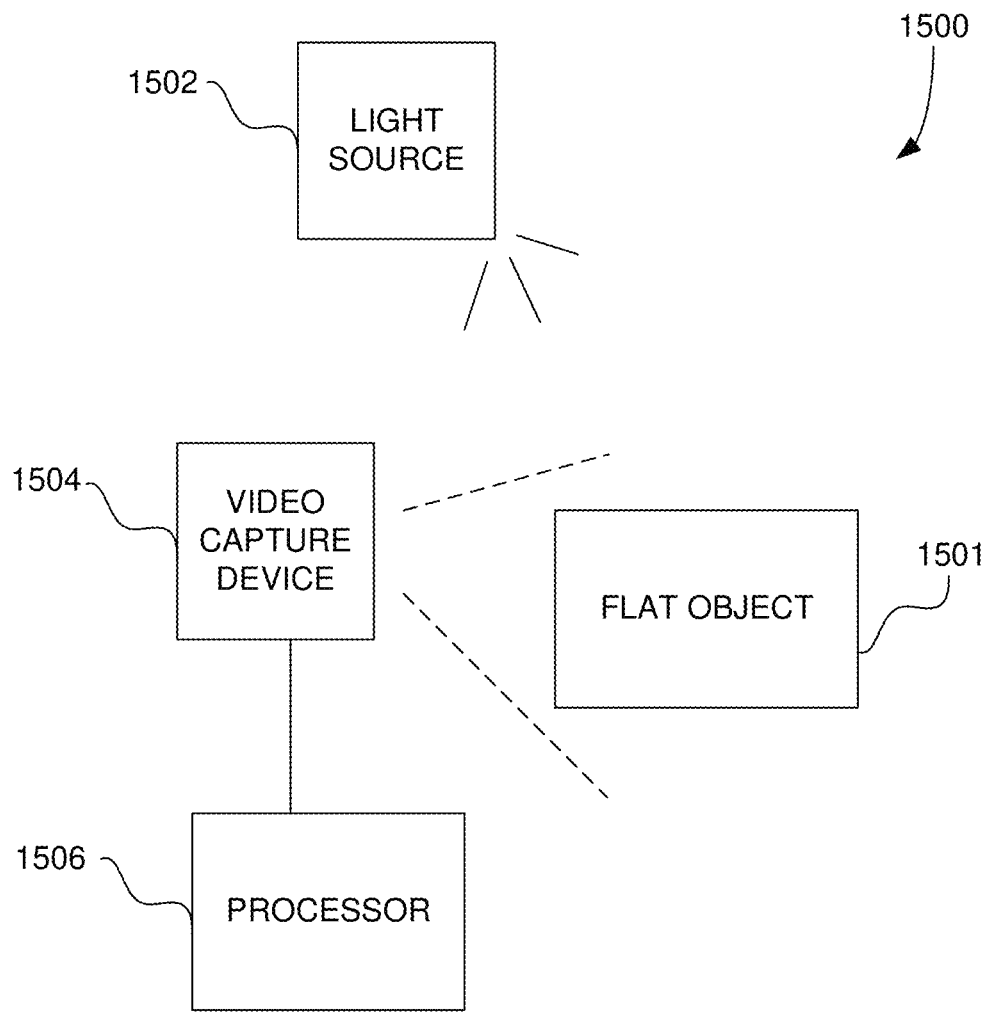
FIG. 15 illustrates an example of a system for obtaining an svBRDF for a flat object in accordance with certain implementations of the disclosed technology.

FIG. 15 illustrates an example of a system 1500 for obtaining an svBRDF for a flat object 1501 in accordance with certain implementations of the disclosed technology. The system 1500 includes a light source 1502 to provide light for a flash video of an area of interest at a relatively fixed distance over the surface of the object 1501. The system 1500 also includes a video capture device 1504, such as a tablet device or mobile phone, for example, configured to capture the flash video. It will be appreciated that multiple light sources and/or multiple video capture devices may be used in alternative implementations.

The system 1500 also includes a processor 1506 configured to align video frame images from the captured flash video into a single panorama with observations from multiple light and view locations for each of a plurality of pixels.

The processor 1506 is further configured to cluster the plurality of pixels into a plurality of clusters by similar appearance and fit a bidirectional reflectance distribution function (BRDF) to each of the plurality of clusters to generate a high-resolution svBRDF.

Figure 16:
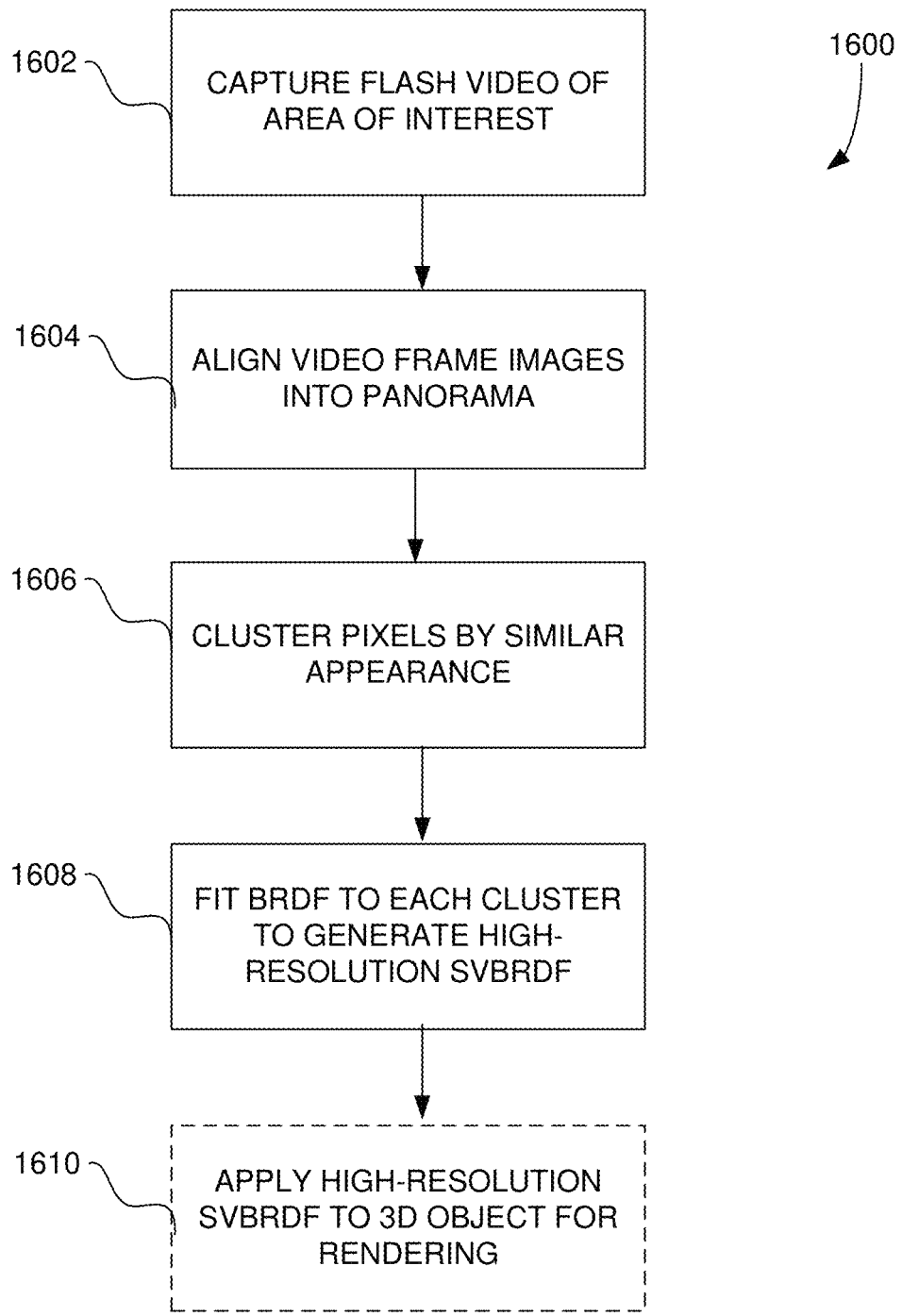
FIG. 16 illustrates an example of a method of obtaining an svBRDF for a flat object in accordance with certain implementations of the disclosed technology.

FIG. 16 illustrates an example of a method 1600 of obtaining an svBRDF for a flat object in accordance with certain implementations of the disclosed technology. At 1602, a video capture device and a light source are used to capture a flash video of an area of interest at a relatively fixed distance over the surface of the object. For example, the first video capture device may be moved over the area of interest in a systematic manner, e.g., in a sinusoidal top-to-bottom and side-to-side manner. The video capture device may be a tablet device or mobile phone, for example, and the video capture device may be integrated with—or separate from—the light source.

At 1604, video frame images from the captured flash video are aligned into a single panorama with observations from multiple light and view locations for each of a number of pixels. At 1606, the pixels are clustered into a plurality of clusters by similar appearance. At 1608, a bidirectional reflectance distribution function (BRDF) is fitted to each of the plurality of clusters to generate a high-resolution svBRDF.

Certain embodiments may include using a second video capture device, such as a tablet device or mobile phone, for example, and a second light source to capture a second flash video of the area of interest at a relatively fixed distance over the surface of the object. These embodiments may further include aligning video frame images from the captured second flash video into the single panorama. The second video capture device may be integrated with—or separate from—the second light source. Alternatively or in addition thereto, the first and second light sources may be the same light source.

In an optional operation at 1610, the high-resolution svBRDF is applied to a three-dimensional (3D) object, e.g., for rendering in an application.

Certain embodiments may include recursively subdividing and fitting a BRDF and normal vector displacement to each sub-cluster. The recursive subdividing and fitting may continue until a residual fit error at each pixel is sufficiently low, for example.

In certain embodiments, multiple fiducial markers may be placed around an area of interest of the flat object. For example, a number of printed fiducial markers may each be placed at an edge of the area of interest. These fiducial markers may be used to establish physical locations. A single reference image of the area of interest may be obtained based on the printed fiducial markers, and a global coordinate system may be established based on the single reference image.

Certain embodiments may include computing a shifted and scaled Fourier transform for each video frame image to detect blurry frames. In such embodiments, the detected blurry frames may then be rejected or discarded, for example.

Figure 17:
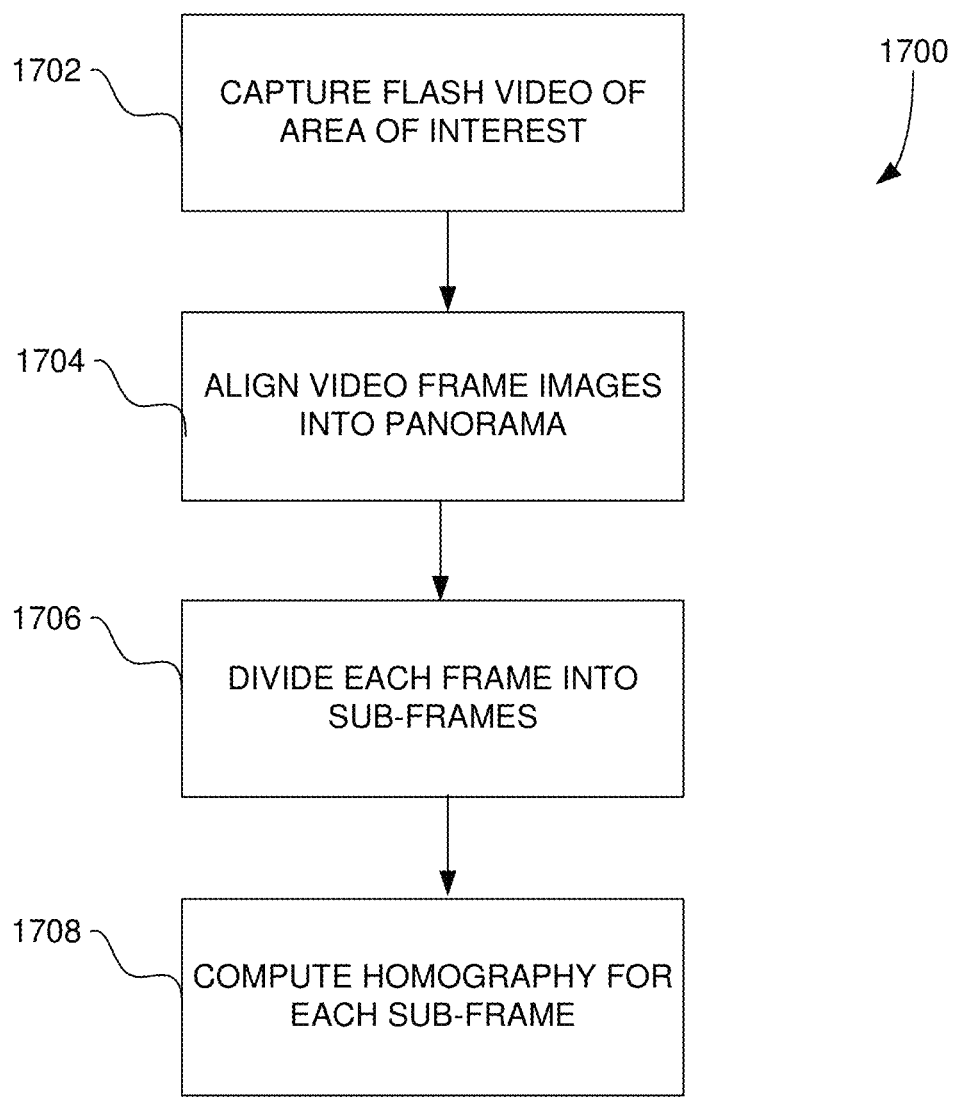
FIG. 17 illustrates an example of a method of capturing and processing video in accordance with certain implementations of the disclosed technology.

FIG. 17 illustrates an example of a method 1700 of capturing and processing video in accordance with certain implementations of the disclosed technology. At 1702, a video capture device, such as a tablet device or mobile phone, for example, and a light source may be used to capture a flash video of an area of interest at a relatively fixed distance over the surface of the object. In certain implementations, multiple video capture devices and/or multiple light sources may be used.

At 1704, video frame images from the captured flash video may be aligned into a single panorama with observations from multiple light and view locations for each of a plurality of pixels. At 1706, each video frame image may be divided into a plurality of sub-frames, e.g., to compensate for lens distortion independent of an explicit lens distortion model. At 1708, a homography may be computed for each sub-frame of each video frame image based on a set of matched features that relate the video frame image to other images.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A method of obtaining a spatially varying bidirectional reflectance distribution function (svBRDF) for a flat object, comprising:
    using a first video capture device and a first light source to capture a first flash video of an area of interest at a relatively fixed distance less than 50 cm over the surface of the flat object;
    aligning video frame images from the captured first flash video into a single panorama with observations from multiple light and view locations for each of a plurality of pixels;
    reviewing each of the video frame images from the captured first flash video and removing blurry video frames detected upon review of each of the video frame images from the captured first flash video;
    obtaining a connected sub-graph of a connectivity map of video frames that remain after removing the blurry video frames;
    removing video frames not contained in the connected sub-graph of the connectivity map;
    clustering the plurality of pixels into a plurality of clusters by similar appearance; and
    fitting a bidirectional reflectance distribution function (BRDF) to each of the plurality of clusters to generate a high-resolution svBRDF.

2. The method of claim 1, further comprising:
    placing a plurality of fiducial markers around an area of interest of the flat object; and
    using the plurality of fiducial markers to establish physical locations.

3. The method of claim 2, wherein the placing includes placing each of a plurality of printed fiducial markers at an edge of an area of interest.

4. The method of claim 3, further comprising obtaining a single reference image of the area of interest based on the plurality of printed fiducial markers.

5. The method of claim 4, further comprising establishing a global coordinate system based on the single reference image.

6. The method of claim 1, further comprising recursively subdividing and fitting a BRDF and normal vector displacement to each sub-cluster.

7. The method of claim 6, wherein the recursive subdividing and fitting continue until a residual fit error at each pixel is sufficiently low.

8. The method of claim 1, further comprising applying the high-resolution svBRDF to a three-dimensional (3D) object for rendering in an application.

9. The method of claim 1, wherein the first video capture device is a mobile phone.

10. The method of claim 1, wherein the first video capture device is coupled with the first light source.

11. The method of claim 1, further comprising using a second video capture device and a second light source to capture a second flash video of the area of interest at a relatively fixed distance over the surface of the flat object.

12. The method of claim 11, further comprising aligning video frame images from the captured second flash video into the single panorama.

13. The method of claim 11, wherein the second video capture device and the second light source are separate from each other.

14. The method of claim 11, wherein the first and second light sources are the same light source.

15. The method of claim 1, further comprising:
computing a shifted and scaled Fourier transform for each of the video frame images to detect the blurry video frames that are rejected.

16. The method of claim 1, wherein the using includes moving the first video capture device over the area of interest in a systematic manner.

17. The method of claim 16, wherein the systematic manner includes sinusoidal top-to-bottom and side-to-side manner.

18. The method of claim 1, further comprising carrying out a feature matching process on the first flash video, and removing video frames of the first flash video due to insufficient feature matches prior to obtaining the connected sub-graph.

19. The method of claim 1, wherein the connectivity map is a matrix of inlier counts, and wherein the connected sub-graph of the connectivity map has the most members.

20. A system for obtaining a spatially varying bidirectional reflectance distribution function (svBRDF) for a flat object, comprising:
at least one light source to provide light for a flash video of an area of interest at a relatively fixed distance less than 50 cm over the surface of the flat object;
at least one video capture device configured to capture the flash video; and
a processor configured to:
align video frame images from the captured flash video into a single panorama with observations from multiple light and view locations for each of a plurality of pixels;
review each of the video frame images as originally captured from the captured flash video and remove blurry video frames of the video frame images reviewed from the captured first flash video as originally captured;
obtain a connected sub-graph of a connectivity map of video frames that remain after removing the blurry video frames;
remove video frames not contained in the connected sub-graph of the connectivity map;
cluster the plurality of pixels into a plurality of clusters by similar appearance; and
fit a bidirectional reflectance distribution function (BRDF) to each of the plurality of clusters to generate a high-resolution svBRDF.

* * * * *